United States Patent [19]

Lang et al.

[11] Patent Number: 4,514,855

[45] Date of Patent: Apr. 30, 1985

[54] MEANS AND METHOD FOR REDUCTION OF PHASE JITTER

[75] Inventors: Gordon R. Lang, Bolton; Fred M. Longstaff, Islington; Chi H. Lee, Willowdale, all of Canada

[73] Assignee: Ese Limited, Rexdale, Canada

[21] Appl. No.: 519,753

[22] Filed: Aug. 2, 1983

[30] Foreign Application Priority Data

Sep. 3, 1982 [CA] Canada .................................. 410773

[51] Int. Cl.³ .......................... H03D 3/22; H04L 25/40
[52] U.S. Cl. ...................................... 375/97; 328/155; 375/118
[58] Field of Search ..................... 333/17 R; 328/155; 375/11, 97, 118, 119, 120; 331/1 R, 23; 455/258, 260, 265

[56] References Cited

U.S. PATENT DOCUMENTS

| 3,562,675 | 2/1971 | Urell | 333/17 |
| 4,309,649 | 1/1982 | Naito | 328/155 |
| 4,462,108 | 7/1984 | Miller | 375/97 |
| 4,475,088 | 10/1984 | Beard | 328/155 |

Primary Examiner—Benedict V. Safourek

[57] ABSTRACT

A sinusoidal component of phase jitter in a communications channel is reduced by apparatus including means providing an oscillator signal at the receiver and modifying the received signal phase in accord therewith. Decision means determine the probable transmitted signal and the signals at the input and output of the decision means are compared to determine the residual phase jitter. The residual phase jitter is compared with a suitably delayed oscillator signal and the results of the comparison are used to alter the modification (by the oscillator signal) of the received signal to further reduce the phase jitter. Preferably the results of the comparison are also used to reduce the frequency difference between the oscillator signal and the phase jitter.

8 Claims, 2 Drawing Figures

MEANS AND METHOD FOR REDUCTION OF PHASE JITTER

This invention relates to circuitry for reducing the effects of phase jitter in a digital data communications receiver and has principal application to telephone communications channels.

The phase jitter with which the invention is concerned is introduced into the communications channel between a data transmitter at one end of the channel and a corresponding data receiver at the other end of the connection. The invention is particularly applicable to the situation in which some of the phase jitter consists of fairly regular sinusoidal variation at one or more frequencies. One cause for this condition is power-line frequency related jitter affecting the modulating carrier frequencies used by the telephone companies in frequency multiplexing the telephone channels. Jitter of such modulating carrier frequencies may be caused by small alternating current ripples on the power supplies used by the telephone companies to power such carrier frequency equipment. For this and other causes the phase jitter affecting data communication over telephone channels tends to have some (often dominant) sinusoidal components related to the frequency of the alternating current power used by the telephone carrier(s) system. In Canada and the United States these components are usually integral multiples of 60 Hz such as 60 Hz, 120 Hz, 180 Hz, etc. In some parts of Europe the fundamental frequency is often 50 Hz resulting in components such as 50 Hz, 100 Hz, 150 Hz, etc.

Of course there can be other essentially random or time varying components of phase jitter which would only be addressed by this invention if parameters such as frequency, amplitude and phase of such phase jitter components were only slowly time varying as is the frequency of the alternating current power supplies. This invention does not work well on random phase jitter but works best when there are components of the phase jitter which have slowly varying parameters.

(A faster acting method of dealing with random jitter or jitter with rapidly varying parameters is discussed in U.S. Pat. No. 4,027,250, "Apparatus and Method for Reducing Effects of Amplitude and Phase Jitter", G. R. Lang, May 31, 1977).

The phase jitter component of the received signal $\phi$ may be considered as a function of time (i.e. $\phi$ is $\phi(t)$ equal to $R(t) + A_1 \sin(w_1 t + \theta_1) + A_2 \sin(w_2 t + \theta_2) + A_3 \sin(w_3 t + \theta_3)$ etc, where $R(t)$ represents a rapidly varying random function of time which the invention does not address). The sinusoidal components are non-random and subject to identification and cancellation to a substantial degree in accord with the invention. For cancellation of the component $A_1 \sin(w_1 t + \theta_1)$ the invention provides a sinusoidal output of controllable amplitude and phase which amplitude and phase are continuously compared with the amplitude $A_1$ and the phase $w_1 t + \theta_1$ of the phase jitter. The symbol $\phi_j$ used in the description hereafter refers not to the phase jitter $\phi$ as received at the receiver but to the residual phase jitter existing from time to time, after reduction in accord with the invention, of the phase jitter $\phi$.

The invention is applied at the receiver of a communications channel. At such receiver, in accord with present practice, the received signal is demodulated and the demodulated signal is provided to a decision making apparatus where the decision is produced being such apparatus' determination of the signal which was probably transmitted. Such decision signal is of course the signal forwarded to the user of the channel.

The invention provides a controllable oscillator at the receiver preferably selected to have a frequency approximating that of the principal component of the phase jitter. (In some cases, the slow acting components of phase jitter can be, to some extent, assessed during training periods when the data transmitted is known). Later discussion will deal with the provision of a second or more similarly acting control lable oscillators. The output of the controlled oscillator is intended to be, as nearly as practicable, equal to the principal component of the disturbing phase jitter and is to be applied in the sense to provide a correction to such phase jitter compensating for such disturbing component. Accordingly, means are provided for modifying the phase and frequency of the received signal in accord with the frequency and phase of the output of the controlled oscillator. In a communications receiver such components as equalizers and filters each have transmission characteristics which depend on the frequency input to the filters. That is different frequency components of the data signal are passed by these filters with differing amplitudes and phase shifts. Thus complicating distortions of the received signal are lessened if the correcting input from the controlled oscillator is applied to the received signal before the received signal has encountered the equalizer and before the received signal has encountered as many of the filter steps as practical. In accord with a preferred aspect of the invention, the correction by the controlled oscillator output is applied at the demodulation stage of the receiver. By comparison of the form of the received signal as presented to the decision device, with the decision signal produced by such device a measure of the phase angle $\phi_j$ of the phase jitter can be made. $\phi_j$ will be randomly varying to the extent that the jitter is of the random type. It is the reduction of the sinusoidal component toward which the inventive apparatus is directed.

Means are provided for continually comparing the output of the controlled oscillator with the continually varying phase jitter angle $\phi_j$. However a long but measurable delay occurs between the application of the controlled oscillator output to the received signal and the location of the calculation of $\phi_j$. Such delay occurs in the filters and equalizers. Thus for comparison of the $\phi_j$ signal with the correcting controlled oscillator signal it is necessary that the controlled oscillator signal to be compared with $\phi_j$ be delayed, relative to the controlled oscillator signal which is applied to the received signal, by the time delay encountered by the received signal between such application and the decision apparatus. Means are provided for continually comparing such delayed controlled oscillator signal with the $\phi_j$ signal then existing and obtaining a measure of the phase and amplitude difference therebetween. Means are provided for lessening the effects of random components in $\phi_j$ in such measure of phase and amplitude difference. Correction signals are provided as a result of such phase and amplitude difference which are used to modify the output of the controlled oscillator (before application to correct the received signal) in the sense to reduce $\phi_j$. In this manner the output of the controlled oscillator is modified so that it moderates or corrects the received signal in a sense to reduce the phase jitter signal $\phi_j$. In such manner the inventive apparatus may compensate to a considerable extent for a phase and amplitude difference between the phase jitter signal $\phi j$ and the fundamental frequency of the controlled oscillator. For example, if the phase jitter is caused by a disturbing frequency of 50 Hz or 60 Hz and the controlled oscillator has a frequency of 55 Hz the modified output of the controlled oscillator will remove a large proportion of the portion of the phase jitter caused by the 50 Hz or 60 Hz disturbance.

It will be realized that the success of the corrective action of the inventive apparatus is dependant upon a high proportion of correct decisions at the decision device. Thus the inventive device will not operate with a high degree of success where; due to the quality of the disturbance of the transmission or due to the high signalling speed, or in fact any other reason; the decision device makes a high frequency of errors.

In a preferred aspect of the invention, the control of the output of the controlled oscillator to compensate for the phase jitter is made more rapid. In addition to phase and amplitude control of the oscillator output, control is also provided for the oscillator frequency. The comparison of the signal $\phi j$ with the delayed oscillator signal is used to produce a signal indicative of the frequency difference between that of the signal $\phi j$ and the delayed controlled oscillator frequency. This signal is applied to vary the frequency. This signal is applied to vary the frequency of the controlled oscillator (as distinct from its output) in a sense to reduce the difference between the delayed controlled oscillator frequency and the frequency of the phase jitter resulting in $\phi j$. Such corrective signal improves the ability of the control circuit to cause the controlled oscillator to substantially compensate for the sinusoidal component of the phase jitter and assists in this regard the phase and amplitude control of the oscillator output previously described. For example only, if a controlled oscillator initially operating at 55 cycles, encounters phase jitter having a predominant component at 60 cycles, the frequency control last mentioned will play the principal role in bringing the frequency of the controlled oscillator to the vicinity of 60 cycles assisting the phase and amplitude control of the controlled oscillator output first mentioned in bringing the output of the controlled oscillator in close agreement with the sinusoidal component of the phase jitter.

In drawings which illustrate a preferred embodiment of the invention,

FIG. 1 shows in block form a circuit for carrying out the invention.

Figure 1:
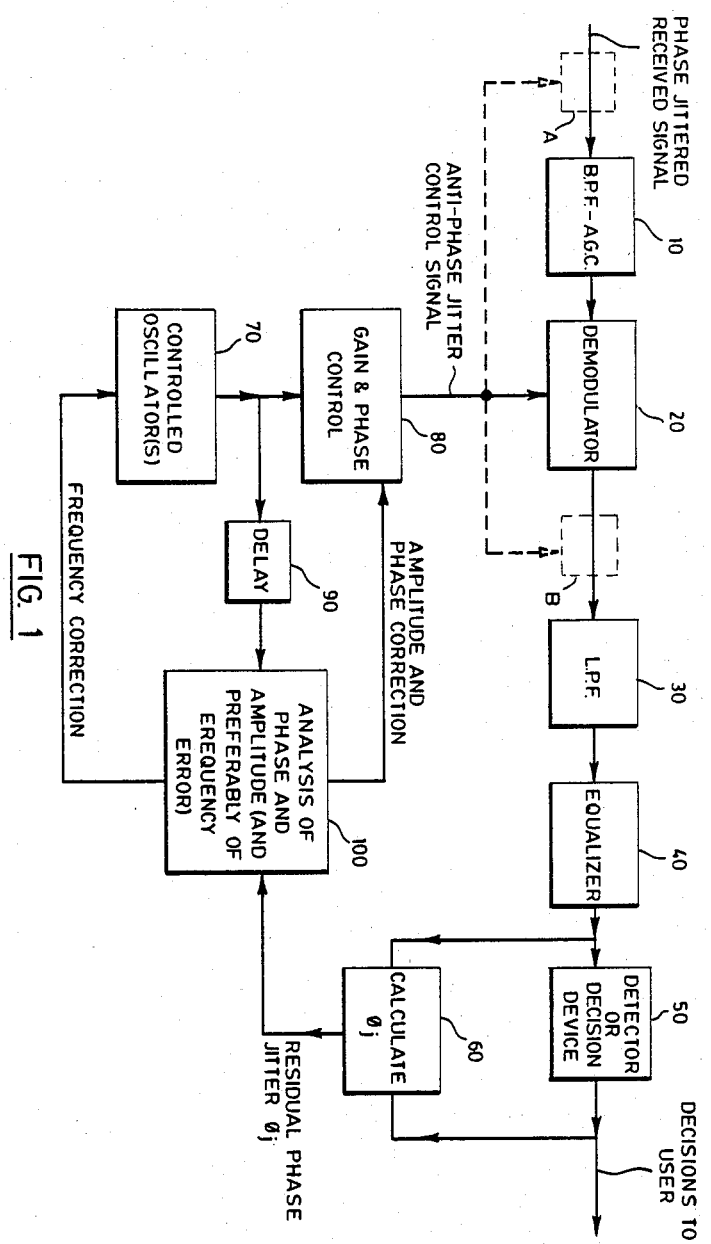
FIG. 1 shows a schematic circuit in accord with the invention.

In FIG. 1 are shown the usual principal components of a digital data communication receiver. The received signal is treated by the band pass filter and automatic gain control 10. The signal output of block 10 is demodulated at demodulator 20 and the output is filtered at low pass filter 30 and equalized at equalizer 40. The output of the equalizer 40 is provided to what may alternatively be called a decision device or detector 50. The detector or decision device 50 provides at its output a signal corresponding to its decision as to the signal transmitted. The output of decision device 50 is supplied to the user. Such is the conventional receiver arrangement.

In accord with the invention block 60 represents a circuitry for continually calculating $\phi j$, the angle of phase jitter, from the comparisons of and operations upon the input and output of decision device 50. (It should be made clear at this point that the validity of such decisions and calculations at block 60 depends upon a low proportion of errors by the decision device 50. If for any reason; which might include transmission disturbances, component problems, or a combination of these with high signalling speed; there are a high proportion of errors in decision device 50, then the calculation of $\phi j$ will frequently be in error and the function of the inventive circuitry will be deleteriously affected). It will be noted that for the invention to be useful $\phi j$ must have a significant sinusoidal component which is the component which it is intended to cancel or substantially reduce through the inventive apparatus.

A controllable oscillator 70 provides a signal for application both to the incoming signal and for analysis with the $\phi j$ signal output of block 60. Because the output of controlled oscillator 70 is to be used to counteract the major sinusoidal component of the phase jitter in the received signal, the central or initial frequency of the oscillator will be chosen as closely as possible to such major sinusoidal phase jitter component if the latter is known.

The output for the controlled oscillator is modified at control block 80 for amplitude and phase.

The output of control 80 is used to modify the received signal to reduce a major sinusoidal component of $\phi j$. The application point of the control 80 output signal is shown as being at the demodulator. However, the application point may be applied at an earlier or later stage than the demodulator. Operation of the control circuit depends on determination to a reasonable degree of accuracy of the time delay encountered by the received signal between such application point and the decision device.

Phase jitter applied to the transmitted signal can be modelled heuristically as causing the band of data signals to be shifted upward and downward in frequency at rates related to the phase jitter frequency components. In effect then, the filtered and equalized received signals undergo slightly different transmission characteristics in a time varying manner. The equalizer is usually too slow in adaptation to follow (or adapt) and mitigate some of the corresponding (small) distortion that this effect gives to the received data signal. For this reason it is important to, if possible, correct for the phase jitter prior to as many filter operations in the receiver as is possible (or convenient). Accordingly, it is an aim of this invention to correct for jitter early in the stages of the data receiver. This is in contrast to the quoted invention described in U.S. Pat. No. 4,027,250 using a feed forward process which corrects at a very late point in the receiver process.

If desired to separate the modification of the signal from the demodulator the modification may be made at block B. Alternatively the application might be made at point A before the signal encounters the band-pass filter since there is distortion caused in the filter. Application at points A or B would probably require an increase in the cost or complexity of implementation.

Reference to the point of modification of the received signal by the signal from block 80 (also called the point of application of the block 80 output) is important because the delay called the "modification-analysis delay" from the point of application to the calculation of $\phi j$, is important to the design of the controlled oscillator circuit. The major component of such delay is in the equalizer and to some extent in the low pass filter.

The output of oscillator 70 is also provided to analyzer 100 for analysis of the phase difference, amplitude difference and (preferably) frequency difference between the oscillator output and the phase jitter φj. The received signal, as modified by the output of control 80 is materially delayed between the modification by control 80 and the calculation of φj.

A delay 90 is therefore introduced into that output of the controlled oscillator 70, which is used for comparison with φj, the delay being equal to the modification analysis delay previously discussed. In a preferred embodiment of the invention to be described, and operating in the digital mode, the use of a physical delay is avoided by providing a series of digital signals to device 80 and a second series of digital signals to analyzer 100 the second series being related to the first by the requisite delay.

The delayed oscillator signals are provided to analyzer 100 as are the signals representing φj. The analyzer is designed to compare the delayed oscillator signals with the durative (as opposed to transient) components of φj. As a result of such analysis a signal is provided to control 80 indicative of the phase and amplitude corrections to be made to the controlled oscillator output to reduce the durative components of φj. Control 80 will modify the controlled oscillator output in accord with the signal from analyzer 100 in a sense to reduce the durative components of φj. However, it will be realized that the correction to the received signal will not be exact because of the time interval encountered by the received signal between the point of modification or application and the generation of the correction signal. However, the continual correction involved with the inventive apparatus renders it useful for durative and for sinusoidal components of the phase jitter, although not effective for rapid random transient components.

In practice it is difficult in some cases to sufficiently modify the controlled oscillator output by the phase and amplitude signals from analyzer 100 if the frequency of the oscillator is sufficiently different from that of the sinusoidal component of φj.

Accordingly, a preferred form of the invention provides means in the analyzer for determining the frequency difference between the delayed oscillator signal and φj and such means provide a controlled signal to oscillator 70 to in a sense alter its frequency to reduce such difference. Accordingly in such preferred form the frequency control reduces the frequency difference and the amount of control of frequency which must be exercised through the phase correction signals to control 80.

Figure 2:
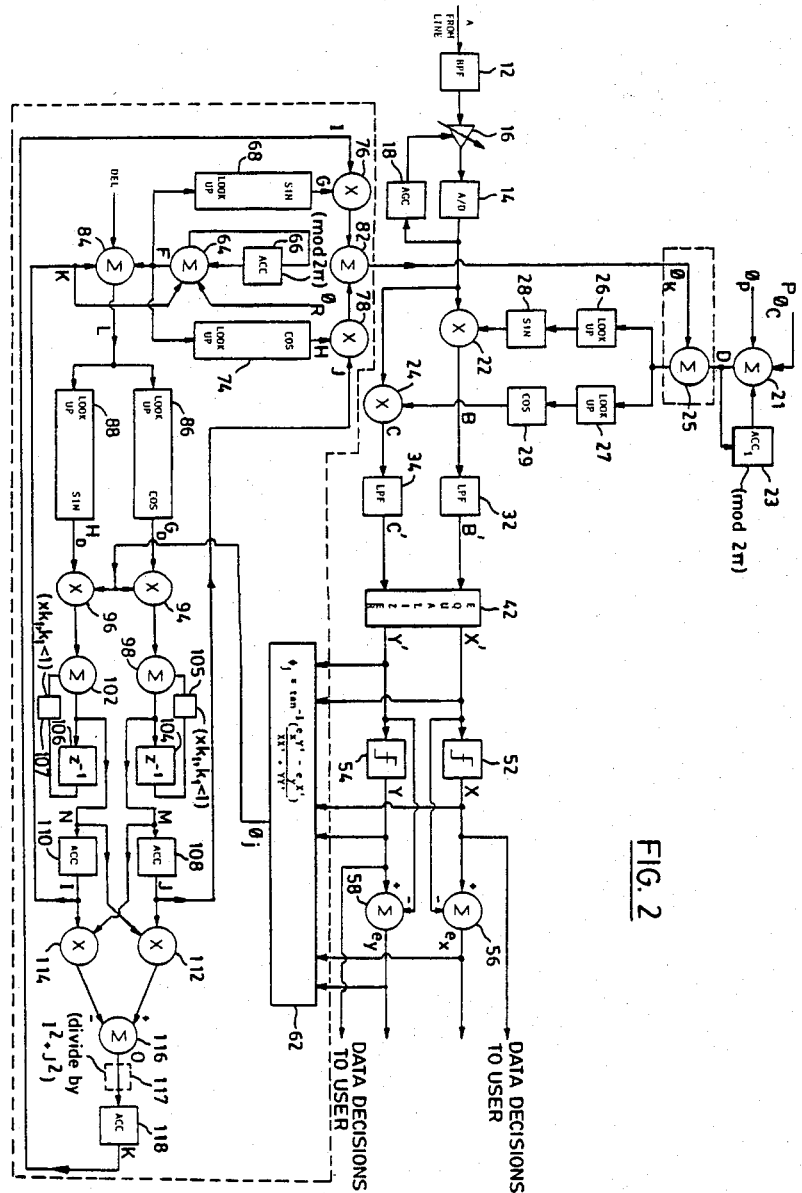
FIG. 2 is an embodiment of the invention in the digital mode.
Figure 2:
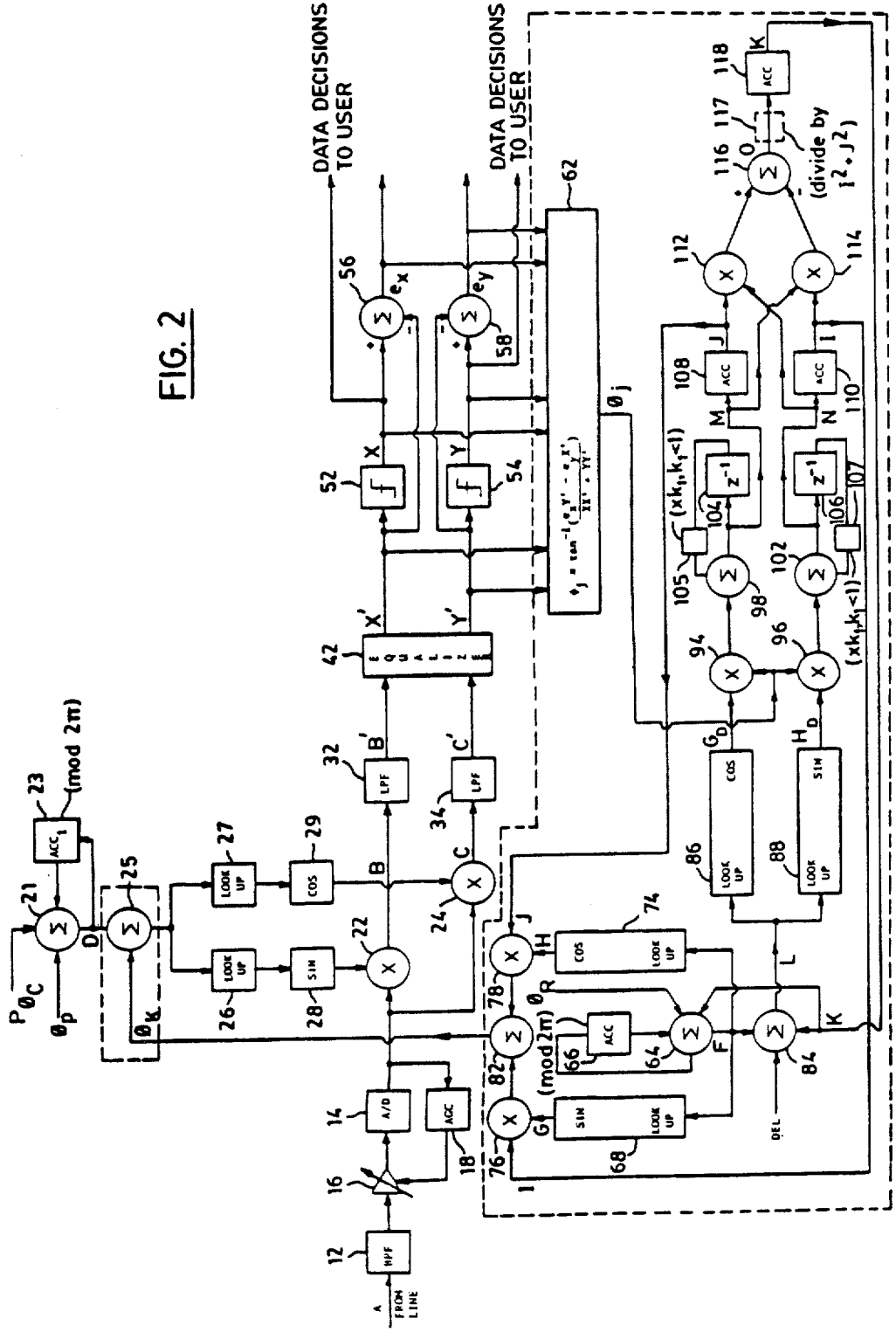

FIG. 2 shows a preferred embodiment of the invention in the digital mode. Since the operation is in the digital mode clocking signals corresponding to the baud interval (from sources and lines not indicated) are provided to the operating blocks following the analogue to digital convertor. Thus the digital elements perform the operations indicated at each block e.g. summing, multiplying, accumulating at each clock pulse to provide an output for the succeeding block. The symbols in FIG. 2 represent decision devices or detectors (well known to those skilled in the art) which at each clock pulse determine, for the digital information at their inputs the probable corresponding transmitted digital information.

The clock rate at the demodulator and up to the equalizer will be that of the sample rate which will be at least as great as the baud rate. The clock rate of the devices to the right of the equalizer and in the large dotted area at the bottom of the figure will be at the baud rate.

In FIG. 2 is shown a preferred embodiment of the invention used with a digitally implemented receiver for a quadrature modulated data transmission system. The dotted lines enclose the circuitry constituting the improvement to this invention.

Before describing the inventive circuitry the conventional operation of the blocks in FIG. 2 will be described. The line signal from the companion remote transmitter enters the receiver at point A where it is band pass filtered at band pass filter 12 and passed to analogue-to-digital (A/D) convertor 14 via variable gain amplifier 16. The digital output signal of the A/D convertor 14 is fed back via an automatic gain control circuit (AGC) 18 which in turn controls the gain of variable gain amplifier 16 so as to regulate the R.M.S. level of the output of A/D convertor 14. The regulated digitized received signal is then passed through the quadrature demodulator which is to be described in more detail hereafter. The quadrature demodulation is effected by multiplying the output of convertor 14 by the sine values of a demodulating signal at multiplier 22 and by the cosine values of such demodulating signal at multiplier 24. The outputs of multipliers 22 and 24 are respectively filtered at low pass filters 32 and 34 and the outputs of the low pass filters are passed to the complex equalizer 42 for equalization. The equalized outputs X' and Y' of equalizer are respectively supplied to decision or delection devices 52 and 54. The decision device 52 determines for the input signal X', the probable transmitted signal X and provides the latter at its output. The decision device 54 determines, for the input signal Y', the probable transmitted signal Y and provides the latter at its output. Summers 56 and 58 operating subtractively, in accord with the signs indicated respectively compute the errors signals $e_x=(X-X')$ and $e_y=(Y-Y')$.

(Error signals $e_x$ and $e_y$ are normally employed to continuously adapt equalizer 42 by circuitry not shown so as to remove some of the effects of linear distortion due to the transmission medium between the transmitter and the receiver). The decision signals X,Y are then passed to the user through other apparatus, e.g. descramblers, parallel to serial convertors, demultiplexers etc., which are not necessary to the discussion of the invention.

Not shown in the diagram are such normal facets of such a digital receiver, normally forming part of a modem for the recovery of data timing and for carrier frequency acquisition, which again do not form part of this invention.

As previously explained the description assumes that data timing and clock pulses are available so that digital data can be clocked through our apparatus as it is through the normal apparatus of the receiver.

A portion of the carrier recovery system is however now described because it is used in the embodiment to be described. At the point P in FIG. 2 signal $\theta c$ is provided and represents the phase increment used to create the nominal receiver carrier frequency. Another phase increment signal $\theta p$ is summed with $\theta c$ at summer 21. The phase increment $\theta p$ is a correction signal used to adjust the received carrier frequency to be commensurate with the carrier frequency used at the transmitting location. The derivative of $\theta p$ is not shown since it is not pertinent to the operation of this invention and is part of the known carrier acquisition apparatus already referred to.

The signal at D, consists of the output of the accumulator 23 plus the increments $\theta p$ and $\theta c$. The sum of increments $\theta p$ and $\theta c$ represents a phase increment that corresponds closely to the correct carrier frequency as used by the transmitter. The accumulator $ACC_1$ is used so that each phase increment adds to the previously accumulated series of phase increments.

In the digital mode being described, the signal at D acts as an address to be applied to circular look up tables 26 and 27 to produce at the outputs of blocks 28 and 29 signals reflecting the sequence of sine and cosine values, respectively of the demodulation carrier.

The above are the components of a normal quadrature data receiver which are necessary to the operation of the invention. In FIG. 2 calculator block 62 is connected to receive the signals X', Y', X, Y, $e_x$ and $e_y$ and is designed to calculate the residual phase jitter:

$$\phi j = \tan^{-1} \frac{(e_x Y' - e_y X')}{XX' + YY'}$$

(The term 'residual' refers to the phase jitter after correction by the inventive circuit to be described). As previously noted this invention is concerned with the reduction of one or more sinusoidal components of $\theta j$ each of which will have the form sinusoidal component of $\phi j = A_1 \sin(w_1 t + \theta_1)$ and where $A_1$ represents the amplitude  
$w_1 t + \Theta_1$ represents the phase  
$w_1$ represents the frequency in radius per second.  
} of such sinusoidal component of phase jitter Thus if the received signal has been disturbed by a small amount of sinusoidal phase jitter during transmission and in the absence of circuitry in accord with the invention, $\phi j$ will have initially a corresponding major component which is a digitized sinusoid which is of the same frequency as the disturbing phase jitter and with an amplitude which is proportional to the amplitude of the disturbing phase jitter. (The requirement that the sinusoidal phase jitter be small is because a large jitter will increase the number of decision errors at decision devices 52 and 54 as to impair the effectiveness of the invention. In general the invention will not be effective at times when a high frequency of decision errors is made for any reason since, at such times, the calculation $\phi j$ will be incorrect).

It is the object of the invention to produce a counteracting phase jitter in the receiver which will substantially reduce the amplitude of the residual phase jitter $\phi j$ and thus reduce the frequency of possible decision errors at devices 52 and 54 due to such phase jitter. The counteracting phase jitter, developed by the circuitry of the invention is embodied in the phase increment signal $\theta_k$ applied to summer 25. Thus, the phase increment $\theta_k$ phase modulates the quadrature demodulation carriers by sinusoidally (digitized) advancing and retarding the address used for looking up the demodulating carrier values resulting in the quadrature sine and cosine signals appearing at the outputs of blocks 28 and 29 respectively.

It has been found that the residual phase jitter $\phi j$ need not be accurately calculated but may merely be approximated since, once the inventive circuitry has come into operation, $\phi j$ tends to be relatively small and can be approximated as such. For example it has been found satisfactory to use:

$$\phi j = A - \frac{A^3}{3} \text{ where}$$

$$A = \frac{(e_x Y' - e_y X')}{XX' + YY'}$$

In many applications further simplifications can be employed with little degradation in performance such as substituting XX and YY for XX' and YY' respectively, and it is possible to use other forms of approximation that will be obvious to those skilled in the art.

The preferred embodiment deals with a situation where the dominant sinusoidal component of phase jitter will frequently have a frequency of either about 60 Hz or about 50 Hz depending on whether the receiver is located in the U.S. or Canada, on the one hand, or in the U.K. on the other hand. An oscillator is provided comprising summer 64 and accumulator 66. The phase increment $\theta_R$ provided to summer 64 may be chosen where 60 Hz or 50 Hz frequencies will be encountered to be suitable for the generation of 55 Hz digital sine and cosine value signals so that the output signal F of summer 64 will be initially (i.e. before modification by the circuitry to be described) to look up at "look-up" tables 68 and 74 the 55 Hz since and cosine values appearing at the output as signal G and H. The accumulator 66 is mod $2\pi$ so that when the value therein passes the value equivalent to 360° for addressing the loop up tables, it again commences from zero. This is of course also true of accumulator 23. Signals G and H after respective multiplication at multipliers 76 (by the value of signal I) and 78 (by the value of signal J) and summation at summer 82 form the signal $\theta_k$ previously referred to.

A considerable delay is encountered by the received signal between the demodulation stage (being the location in the preferred embodiment where the corrective signal is applied to the received signal) and the creation of $\phi j$. The major component of such delay is in the equalizer. It is therefore necessary to provide a corresponding delay in providing the 55 Hz signal corresponding to the output of summer 64 for cross-correlation with the residual phase jitter $\phi j$ to form the signals I and J which in turn are used to produce $\theta_k$. While it would be possible to transmit the output of the summer 64 to the cross-correlation circuitry over a real delay (as would be done with the output of a 55 Hz oscillator in the analogue mode) it is found more convenient in the digital mode to provide the delay in a different manner. The equivalent of a time delay for the sinusoidal frequency components for cross-correlation is to produce a phase lag (relative to G and H) proportional to both the desired amount of delay and the frequency. This phase lag is the value represented by the DEL applied to summer 84 along with output of summer 64. The value DEL is selected to provide that the output L of summer 84 lags the output F of summer 64 by the time delay between demodulator multipliers 22 and 24 and the creation of $\phi j$ at 62.

In the preferred embodiment a correction will be made to the frequency represented by both summers 64 and 84 by the signal K whose development is yet to be described. Signal K may be positive or negative to be subtracted or added to this sum in summer 84. The phase offset between summers 84 and 64 represents a shift of the address used to address a "look-up" table for sine and cosine values.

It will be noted that the signal K is also used as an input to summer 64 where it acts to adjust the nominal frequency, as determined by $\theta_R$ to more closely approximate the frequency of the disturbing phase jitter.

The signal L from summer 84 is used to look up tables 86 and 88 respectively to produce at the outputs the corresponding values of cos and sine to the summer 84 phase values. The cosine output of block 86 is multiplied at multiplier 94 with the contemporaneously existing value of $\phi j$. The sine output of block 88 is multiplied at multiplier 96 with the contemporaneously existing value of $\phi j$. The outputs of multipliers 94 and 96 are respectively averaged. The averaging of multiplier 94 output is performed by the summer 98 which adds the output of multiplier 94 to a fed back portion of the summer 98 output. The feedback involves a delay of the summer 98 output of one baud at delay 104 and a multiplicator of the delay 104 output by $k_1$ where $k_1$ is a positive number less than 1. A similar averaging operation is performed by the delay 106 and feedback multiplier 107 for summer 102. The effect of the summer 98 with its feedback circuitry is to provide a low pass filter to pass the difference frequency between the two inputs to multiplier 94 and to comparatively attenuate higher frequencies such as the sum of the inputs to multiplier 94. Of course the difference frequency may, in some cases, be considerably attenuated with respect to zero frequency and the circuits will still function effectively. Likewise the effect of summer 102 with its feedback circuitry is to pass difference frequency between the two inputs to multiplier 96 and to comparatively attenuate higher frequencies such as the sum of the inputs to multiplier 96 as with counterpart summer 98 the difference frequency passed by summer 102 and its circuitry may, in some cases, be considerably attenuated with respect to zero frequency and the circuit will still function affectively. For further information on such digital low pass filters see "Digital Filters Analysis and Design" by Andreas Antoniou, McGraw Hill. The effect of the multiplication and averaging described is to provide approximate cross-correlation of each of the cosine and sine signals with the $\phi j$ phase jitter signal to provide the signals M and N. Signals M and N define a vector approximately representative of the desired correction to the output of summer 64 to reduce the residual phase jitter $\phi j$ by reducing the predominant sinusoidal component. The signals M and N are then respectively added to accumulators 108 and 110 respectively. The accumulated outputs are signals I and J. I and J represent the cross correlation of $\phi j$ with the sine and cosine signals G and H where G and H have been suitably delayed (being $G_D$ and $H_D$ shown at the output of blocks 86 and 88 in their delayed form) so as to be time commensurate with $\phi j$. As such I and J can be considered as the amounts of the G and K signals that are used to form, by addition, $\phi j$. Thus, the multiplication of signal G by the value of signal I at multiplier 76, the multiplication of signal H by the value of signal J at multiplier 78 provides products which are summed at summer 82. The output of summer 82 is $\theta_k$ which is used to create phase jitter in the output of summer 82 in the opposite sense to the phase jitter introduced by the channel and result in the reduction of $\phi j$.

Without the development of the additional signal K, hereafter to be described, the inventive system so far described would (without adjustment of the nominal 55 Hz reference frequency) continuously vary the values I and J to cause a reduction of phase jitter occurring at either 60 Hz (or 50 Hz). Thus circuitry which corrects the phase of the controlled oscillator (without control of its fundamental frequency as hereinafter described) is considered within the scope of the invention.

However, the system so far described is limited in its ability to cancel when there is such a (5 Hz) difference between the frequency of the oscillator and the predominant component of the phase jitter. This is because of the slowness of response of the feedback loop involved. The response is necessarily slow because of the long time delay in the loop (largely due to the equalizer).

Typically such delay times may be in excess of 15 decision cycles (bauds). In one of our applications this delay has the value of about 44 bauds and in real time units is 18.3 ms. There is a phase shift, equivalent to this delay which together with other phase shifts (90° in an accumulator and somewhat less than 90° in the digital low pass filters) limit the loop gain than can be employed such that the loop gain is less then unity at all frequencies for which the loop phase shift exceeds 180°. Such limitation on loop gain applies to all embodiments of the invention and not merely to the preferred facet being described.

Operation of the system can be improved by developing a signal to adjust the nominal reference frequency (55 Hz in our example) to a value closer to the frequency of the disturbing phase jitter at 60 Hz (or 50 Hz). This is accomplished by forming a cross product of the vectors, I,J and M,N as is shown in FIG. 3 where (NJ-MI) forms the signal O which is dependent on the frequency error.

The cross product of the vectors, I,J and M,N represented by the signal K is found to be dependent on the frequency error and with transient fluctuations expected, it may be said that, in general K increases and decreases with increasing and decreasing frequency difference between the frequency of the controlled oscillator and the frequency of $\phi j$.

As shown the cross product is formed by multiplying N and J at multiplier 112, multiplying M and I at multiplier 114 and summing the results at summer 116. (The product M×I is added with negative sign). The output of summer 116 is accumulated at accumulator 118 and the output K is applied to summer 64 in the sense to reduce the frequency difference of summer 64 output to form $\phi j$.

When the circuitry has been in operation and the loop has settled the signal K will have substantially corrected the reference frequency provided for the frequency output summer 64. The result of such correction occurs also in summer 84 (since it receives the summer 64 output). Thus the signal K applied to summer 64 changes the output of both summers 64 and 84. However, the altered frequency from summer 64 reflected in $\theta_k$ will have an altered phase in the main signal path (i.e. through filters 32–34 and equalizer 42). To compensate for this the signal K is also applied to summer 84 to effect a change in the phase of summer output 84.

As a modification of the circuitry shown, the output O of summer 116 may be normalized by calculating the values $I^2 + J^2$ (the squares of the outputs of accumulators 108 and 110 and dividing the output 116 by $I^2 + J^2$ at 117. It has been found that the normalized signal provides better loop acquisition behaviour at the cost of more computation. In some embodiments if $I^2+J^2$ is smaller than a predetermined small constant value it is replaced by a positive constant to avoid division by zero.

In any event the correction signal K may be scaled as desired and differently at the input to summers 64 or 84 to achieve the desired rate of correction.

If two sinusoidal components of phase jitter are to be cancelled, then two circuits corresponding to that of the lower dotted area of FIG. 2 are provided, each is provided with an oscillator embodied at the summers 64, 84 outputs and each has a nominal frequency approximating one of the phase jitter sinusoids to be cancelled. Each is compared with the residual phase jitter $\phi j$ as described and the correction signals (each corresponding to $\theta_k$ in FIG. 2 are summed for application to the demodulation carrier oscillator summer 25.

When, with the circuitry of the invention, it is desired to cover a very wide frequency range (such as 25 to 250 Hz) use of the signal K will be required. Also, in such a case, care should be taken that the $k_1$ factors in the low pass filters 104 and 106 are suitably chosen for operation at the lowest frequency (having for this example substantial attenuation at 50 Hz). Such low pass filters will also be designed to ensure, in conjunction with the other components in the loop, that the over-all loop is stable and to average and protect against some low frequency of decision errors.

It will be seen that, as the lowest frequency approaches zero frequency, the region requiring attenuation also approaches zero frequency which implies that the invention cannot work well at nearly zero phase jitter frequency. (This is all right since very low frequency phase jitter can be compensated by the signal $\theta p$ (see FIG. 2) (not described herein). Another feature that is advantageous when a very broad frequency range is to be covered is to make the loop gain proportional to frequency so that it is zero at zero frequency and finite at other frequencies. This can be accomplished, for example by multiplying the signal $\phi j$ by a suitable constant times the signal K. Such multiplication can be effected between box 62 and the multiplication of $\phi j$ by $G_D$ and $H_D$ at multipliers 94 and 96. The constant is chosen to provide the required gain at some frequency within the band of interest and to assure stability of the loop.

We claim:

1. Means for reducing the effects of phase jitter at a receiver for a digital data communications channel, said receiver including means for demodulating the received signal to produce a demodulated signal,
   an oscillator for providing an output signal,
   means responsive to the output signal of the controlled oscillator to cause at a predetermined point in said receiver circuit variation of the phase of the demodulated signal in accord with the output of the controlled oscillator circuit,
   control means between said oscillator and said output responsive means for varying the output signal of the controlled oscillator circuit in response to a control signal,
   decision means responsive to the demodulated received signal to provide a decision signal being the probable transmitted signal corresponding to the demodulated received signal,
   means responsive to the demodulated received signal and to the decision signal, to provide a signal as to the phase angle therebetween,
   means providing an signal corresponding to said oscillator signal delayed by substantially the delay to the received signal between said predetermined point and said decision means,
   means responsive to said delayed signal and said phase angle signal to provide a signal indicative of the phase difference between said delayed signal and said phase angle signal,
   means for deriving said control signal from said phase difference signal in a sense to reduce said phase angle.

2. Means as claimed in claim 1 for obtaining a measure of the frequency difference between said controlled oscillator output signal and said phase difference signal and controlling said controlled oscillator to reduce said frequency difference.

3. Means for reducing the effects of phase jitter at a receiver for a QCM communications channel including an analogue-to-digital convertor, a demodulator receiving the output of the convertor and means for providing to the demodulator quadrature signals of the nominal carrier frequency to produce demodulated digital quadrature signals, means for receiving sequential bauds of said demodulated signals and, for each baud, providing decision signals as to the corresponding transmitted baud,
   means responsive to the received signals and the decision signals for a corresponding baud to provide a signal approximating to the phase angle between the received and the decision bauds,
   a controllable digital oscillator circuit for producing first sequential pairs of digital signals corresponding to first quadrature signals at the oscillator frequency,
   means for summing said pairs of digital signals to produce a digital signal corresponding to the phase of the controllable oscillator signals,
   means for varying the phase of the demodulator quadrature signals in accord with said phase corresponding signal,
   means for producing second sequential pairs of digital signals corresponding to second quadrature signals at the oscillator frequency but delayed relative to said first quadrature signals by approximately the delay encountered by the received signal between said demodulator and the production of said signal approximating the phase angle,
   means responsive to said signal approximating the phase angle and said second set of quadrature signals for producing a pair of sequential corrective signals corresponding to the phase and amplitude difference between said second set of quadrature signals and said phase approximating signal,
   means for modifying said first set of quadrature signals in accord with said pair of sequential corrective signals in a sense to reduce the amplitude and phase difference between said second set of quadrature signals and said signal approximating the phase angle.

4. Means as claimed in claim 3 wherein means are provided, responsive to said amplitude and phase corrective signals for providing a signal responsive to the frequency difference between said second quadrature signals on the one hand and said phase approximating signal on the other hand, means responsive to said frequency difference responsive signal to alter said controlled oscillator frequency to reduce said frequency difference.

5. Method of reducing a sinusoidal component of phase jitter of series of transmitted signals at a receiver in a communications channel comprising:
   providing a first oscillator signal,
   modifying the phase of the received signal in accord with the phase of said oscillator signal,
   determining for a modified received signal the probable transmitted signal,
   providing a signal representing the approximate phase angle between said modified received signal and the probable transmitted signal,
   providing a second oscillator signal corresponding to said first oscillator signal but delayed relating thereto by a delay substantially corresponding to the delay between said modification and said determination,
   providing a signal representative of the phase difference between said phase angle signal and said second oscillator signal,
   modifying said first and second oscillator signals in accord with said representative signal in a sense to reduce said phase angle signal.

6. Method as claimed in claim 5 including the added steps of:
   providing a signal representative of the frequency difference between said phase angle signal and said second oscillator signal,
   modifying the frequency of said first and second oscillator signals in accord with the said frequency difference representation signal in a sense to reduce said frequency difference.

7. Means for reducing a component of phase jitter at a series of transmitted signals at a receiver in a communications channel comprising:
   means for providing a first oscillator signal,
   means for modifying the phase of the received signal in accord with the phase of said oscillator signal,
   means for determining for a modified received signal the probable transmitted signal,
   means for providing a signal representing the approximate phase angle between said modified received signal and the probable transmitted signal,
   means providing a second oscillator signal corresponding to said first oscillator signal but delayed relative thereto by a delay substantially corresponding to the delay between said modification and said determination,
   means providing a signal representative of the phase difference between said phase angle signal and said second oscillator signal,
   means for modifying said first and second oscillator signals in accord with said representative signal in a sense to reduce said phase angle signal.

8. Means as claimed in claim 7 having:
   means providing a signal representative of the frequency difference between said phase angle signal and said second oscillator signal,
   means for modifying the frequency of said first and second oscillator signals in accord with said frequency difference representative signal in a sense to reduce said frequency difference.

* * * * *

UNITED STATES PATENT OFFICE
CERTIFICATE OF CORRECTION

Patent No. 4,514,855　　　　　　　　　Dated　April 30, 1985

Inventor(s)　Lang, Gordon R. et al

It is certified that error appears in the above-identified patent and that said Letters Patent are hereby corrected as shown below:

Figure 2 should appear as shown on the attached sheet.

Signed and Sealed this

First Day of October 1985

[SEAL]

*Attest:*

*Attesting Officer*

DONALD J. QUIGG

*Commissioner of Patents and Trademarks—Designate*